US012158888B2

(12) United States Patent
Singhal et al.

(10) Patent No.: US 12,158,888 B2
(45) Date of Patent: Dec. 3, 2024

(54) ASSOCIATING ARTICLES TO CORRESPONDING EVENTS

(71) Applicant: Microsoft Technology Licensing, LLC, Redmond, WA (US)

(72) Inventors: Aman Singhal, Sammamish, WA (US); Deep Narayan Dubey, Kirkland, WA (US); Marcelo Medeiros De Barros, Redmond, WA (US); Prithvishankar Srinivasan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/547,516

(22) Filed: Dec. 10, 2021

(65) Prior Publication Data
US 2023/0131860 A1 Apr. 27, 2023

Related U.S. Application Data

(60) Provisional application No. 63/271,616, filed on Oct. 25, 2021.

(51) Int. Cl.
*G06F 16/2457* (2019.01)
*G06F 16/28* (2019.01)
*G06F 16/9538* (2019.01)

(52) U.S. Cl.
CPC ...... *G06F 16/24578* (2019.01); *G06F 16/285* (2019.01); *G06F 16/9538* (2019.01)

(58) Field of Classification Search
CPC ............. G06F 16/24578; G06F 16/285; G06F 16/9538

USPC ......................................................... 707/727
See application file for complete search history.

(56) References Cited

U.S. PATENT DOCUMENTS

| | | | |
|---|---|---|---|
| 9,319,735 B2 * | 4/2016 | Knee .................. | H04N 7/17318 |
| 2009/0099924 A1 * | 4/2009 | Lensch ............... | G06Q 30/0211 |
| | | | 705/26.1 |
| 2011/0145881 A1 * | 6/2011 | Hartman ............ | H04N 21/4788 |
| | | | 725/118 |
| 2014/0031114 A1 * | 1/2014 | Davison .................. | A63F 13/65 |
| | | | 463/31 |
| 2014/0237053 A1 * | 8/2014 | Abhyanker .......... | G06Q 10/087 |
| | | | 709/204 |
| 2015/0375117 A1 * | 12/2015 | Thompson .............. | A63F 13/79 |
| | | | 463/9 |
| 2017/0094355 A1 * | 3/2017 | McCarty ............. | G06F 16/7867 |
| 2019/0056856 A1 * | 2/2019 | Simmons ................ | G06F 3/017 |

* cited by examiner

*Primary Examiner* — Hosain T Alam
*Assistant Examiner* — Saba Ahmed
(74) *Attorney, Agent, or Firm* — RAY QUINNEY & NEBEKER P.C.; Paul N. Taylor

(57) ABSTRACT

The present disclosure relates to systems and methods for automatically associating additional content with sports games. The systems and methods obtain game schedule data for a plurality of sports games, and for each scheduled game, the systems and methods select articles published within a timeframe of the game date of the scheduled game. The systems and methods identify sports articles associated with the sports game based on entities and event phrases extracted from the sports articles matching the schedule game data. The systems and methods classify the sports articles into a plurality of clusters and use the clusters to associate the sports articles to the game schedule data and store the associated sports articles with the game schedule data.

20 Claims, 5 Drawing Sheets

ASSOCIATING ARTICLES TO CORRESPONDING EVENTS

CROSS-REFERENCE TO RELATED APPLICATIONS

This application claims benefit of U.S. Provisional Patent Application Ser. No. 63/271,616 filed Oct. 25, 2021, which is hereby incorporated by reference in its entirety.

BACKGROUND

Users engage with the browser in multiple ways. For any sports game (upcoming or played), users may receive game schedules, scorecards, and/or standings data when using the browser. While this information about the sports game is useful and concise, the information may not provide descriptive information about the game itself. As such, users typically search for additional content for the sports game on various search engines to gather more information about the pregame analysis or highlights and specific events that happened during the sports game. In addition, for a band on tour or a politician on a campaign trail, users may receive tour schedules and/or the campaign trail schedules when using the browser. The tour schedules and/or campaign trail schedules may not provide descriptive information about the concert or campaign event itself. As such, users typically search for additional content for the concert or campaign event.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method for automatically associating additional content with sports games schedule data. The method includes obtaining game schedule data for a plurality of sports games. For each sports game in the plurality of sports games, the method includes: querying a datastore for articles published within a timeframe of a game date; extracting at least one entity from the articles; identifying sports articles based on the at least one entity extracted matching the game schedule data; classifying the sports articles into a first cluster and a second cluster, wherein the first cluster includes the sports articles for events that have occurred, and the second cluster includes the sports articles for upcoming events; associating the sports articles to the game schedule data based on a comparison of the first cluster and the second cluster to the game date; and storing the associated sports articles and the game schedule data in a datastore.

Another example implementation relates to presenting additional content with sports games on a webpage. The method includes receiving a selection of a sports game. The method includes obtaining one or more sports articles pre-associated with the sports game from a datastore, wherein the sports articles are classified in the datastore into a first cluster with the sports articles for events that have occurred and a second cluster with the sports articles for upcoming events, and the sports articles are obtained from the first cluster or the second cluster based on a game date. The method includes presenting on the webpage the one or more sports articles with game schedule data for the sports game.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
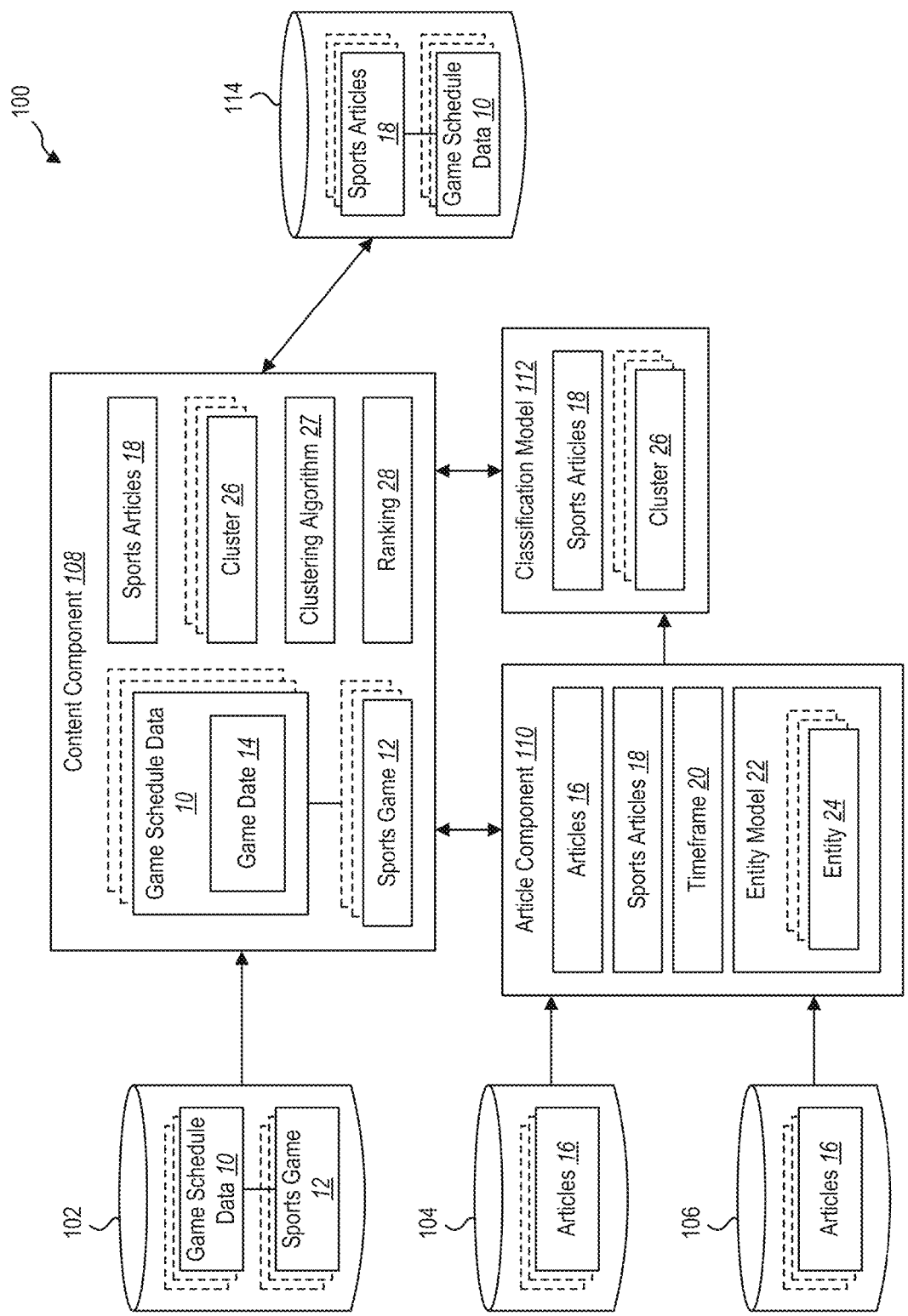
FIG. 1 illustrates an example environment for associating additional content with sports games in accordance with implementations of the present disclosure.

This disclosure generally relates to automatically associating articles to corresponding events. Users engage with the browser in multiple ways. When users access a web browser for a sporting event, the users may be redirected to a game center page by clicking on a sports card for a game or performing a search for the game on a search engine and selecting a search result for the game. A game center page may exist on the browser for every sports game (upcoming or played). The game center pages provide game schedules, scorecards, and/or standings data for the sports game. The game center page may also have other content (videos or other information) in the same domain of the sport or involving the same entities (the sports teams). However, the information provided by the game center page may not correspond to (e.g., provide descriptive information about) the specific game that is upcoming or recently played. Users typically search for additional content for the sports game on various search engines to gather more information about the pregame analysis or highlights and specific events that happened during the sports game (e.g., including pre-game and post-game events). As such, when users access a web browser for an event (e.g., sporting event, a concert, and/or a political campaign event), users may receive schedules for the event and/or information about the venue where the event is occurring. The information provided may not provide descriptive information about the event itself. As such, users typically search for additional content for the event.

For the sports use case, many content providers for sports webpages currently promote only news articles published by the content provider. As such, a large majority of the news articles may be unavailable as the other content presented on the sports webpages. If the content providers want to promote articles that are published by third party content providers, the content provider typically have editors manually identify news articles published by third party webpages to provide to users on the sports webpages that are in the same domain as the game being played (e.g., involving the same sports teams or the same sport). However, due to the volume of scheduled games and the hundreds of news articles constantly being published, manually identifying relevant news articles and/or a most relevant news articles for the scheduled sports games is challenging and time consuming.

The present disclosure describes systems and methods for automatically identifying additional content for a scheduled event. One example use case includes the systems and methods of the present disclosure automatically identifying additional content, such as, sports articles for the scheduled games and tags the scheduled games with the additional content without manual intervention. In addition, the present disclosure describes systems and methods for surfacing the additional content along with a structured data experience for the scheduled events for easy consumption by users.

The systems and methods of the present disclosure identify scheduled games, and for each scheduled game, and select articles published within a timeframe of the scheduled game. Entities and event phrases are extracted from the articles by an entity machine learning model and the articles are selected that have participating team(s) as primary entities and have information identifying the scheduled game. The scheduled games are associated with the selected articles. In some implementations, the scheduled games have a tag or other identifier to associate the selected articles to the scheduled games. In some implementations, the selected articles have a tag or other identifier to identify the associated scheduled game to the selected articles so that the selected articles may be searched and linked later to the scheduled games. A transformer machine learning model may be used to classify the articles into clusters and the embeddings in the articles (e.g., the tags associating the articles to the scheduled games) may be used to find a diverse set of articles to present to the users. The clusters may be used to determine which articles to present to the users based on the game situation. For example, articles placed in a cluster for game highlights may be shown for games already played and articles placed in a cluster for team lineups may be shown for upcoming games. In addition, a clustering algorithm may be used to group similar articles in a cluster. Articles in each cluster with a highest rank may be selected as the additional content to present to the user for the sports game. As an example, at a time when game three of a seven game series has just completed and game four is set to begin, if a user searches for game highlights, then a top ranked article from the highlights cluster for game three may be selected. If instead the user searches for a team lineup, then a top ranked article from the lineups cluster for game four may be selected.

The sports articles may provide a different perspective from other third party websites for the sports game. Moreover, by adding the sports articles to the game webpages, users may be able to easily search the scheduled game data for any sports articles related to the sports games within a timeframe of the sports game. If the users are searching for a particular sports game, or are exploring different sports games, the present disclosure presents the news articles to provide more information for the different sports games explored by the user. As such, the present disclosure identifies additional content related to a specific event (e.g., the scheduled sports game) and surfaces the additional content to the users for easy consumption by the users.

Figure 2:
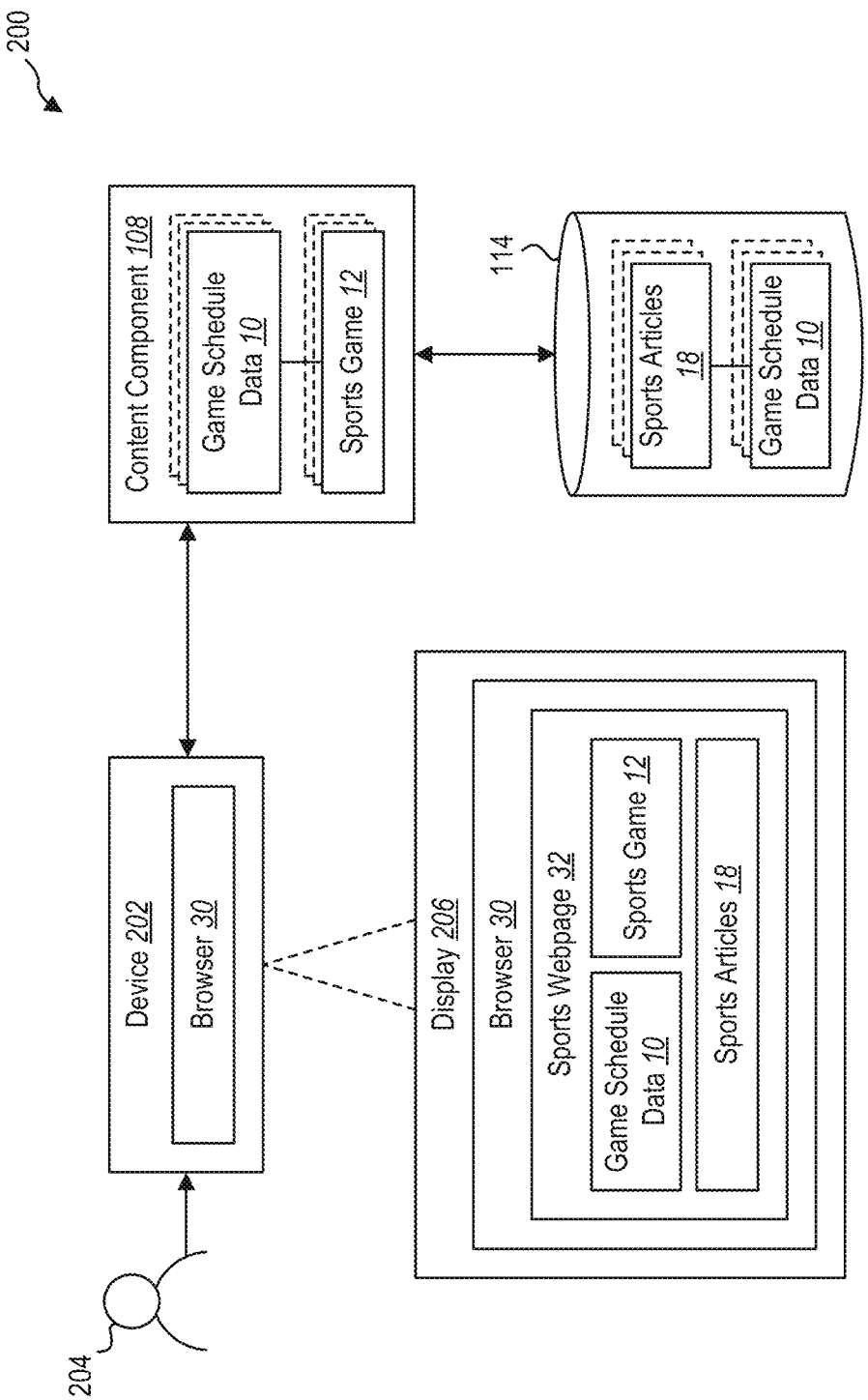
FIG. 2 illustrates an example environment for presenting additional content with scheduled sports games on a webpage in accordance with implementations of the present disclosure.

Referring now to FIG. 1, illustrated is an example environment 100 for associating additional content with scheduled sports games 12. The environment 100 may include one or more datastores 102 with game schedule data 10 for any scheduled sports games 12. In some implementations, the datastore 102 is a content management system accessible by different computing devices in the environment 100 or the environment 200 (FIG. 2). The game schedule data 10 may be for any upcoming sports games 12 or any sports games 12 previously played. As such, each sports game 12 may have associated game schedule data 10. The game schedule data 10 may include, but is not limited to, a game date 14, participating team names, a venue for the sports game 12, a game name, and/or a game number.

A content component 108 may obtain the game schedule data 10 from the datastore 102 for a plurality of sports games 12. In some implementations, the content component 108 obtains a subset of the game schedule data 10 for the sports games 12 that occurred within a time period. The time period may identify upcoming sports games 12 or recently played sports games 12. For example, the content component 108 obtains the game schedule data 10 for the sports games 12 occurring within the next two weeks and the sports games 12 that occurred within the last week from the datastore 102.

For each sports game 12 identified, the content component 108 may associate additional content related to the sports game 12 to the game schedule data 10. The additional content includes sports articles 18. The content component 108 may communicate the game schedule data 10 for the sports game 12 to an article component 110 and may receive the sports articles 18 related to the sports game 12 from an article component 110.

The article component 110 may send a query to one or more datastores 104, 106 that stores a plurality of articles 16. In some implementations, the articles 16 are published by the same content provider. In some implementations, the articles 16 are published by different content providers and the articles 16 from different content providers are stored in separate datastores (e.g., the datastore 104 provides the articles 16 from a first content provider and the datastores 106 provides the articles 16 from a second content provider).

The article component 110 may select the articles 16 that are published within a timeframe 20 of the game date 14 for the sports game 12. The game date 14 includes a start date for the sports game 12 and/or an end date for the sports game 12. The timeframe 20 may include a first number of days before the game date 14 and a second number of days after the game date 14. An example timeframe 20 includes one day before the game date 14 and two days after the game date 14.

The timeframe 20 may be selected based on a frequency of games on the schedule and/or a type of sport (e.g., baseball, soccer, basketball). Different sports may have different timeframes 20 for the articles 16 selected. For example, baseball games are typically played on consecutive days so the timeframe 20 includes a shorter number of days before or after the game (e.g., one day before the game date 14 and one day after the game date 14) as compared to football which is typically played once a week and the timeframe 20 may include more days before or after the game (e.g., one day prior to the game date 14 and two days after the game date 14). The timeframe 20 may also be selected based on the league or other factors of the sport or teams.

The article component 110 may include an entity model 22 that extracts one or more entities 24 from the articles 16. The entity model 22 may be a pretrained machine learning model that receives the articles 16 and extracts one or more entities 24 mentioned in the text of the articles 16 using natural language processing techniques. Entities 24 may include, for example, name of sports teams, name of players, league names, team managers or other individuals' names, event phrases, venue information, date information, time information, and/or location names. The entity model 22 may be customized by pretraining the entity model 22 with sports categories (e.g., sports teams, sports players names, league names, sports venues, team nicknames, team abbreviations). In addition, the entity model 22 may be trained to identify disambiguates among the extracted entities 24. For example, the entity model 22 distinguishes between an article 16 discussing penguins at the zoo and an article 16 discussing the national hockey league team "the Penguins."

The article component 110 may compare the extracted entities 24 for an article 16 with the game schedule data 10 for the sports game 12. If a match occurs between the extracted entities 24 and the game schedule data 10, the article component 110 identifies the article 16 as a sports article 18. For example, if the extracted entities 24 included a team name and if the team's name matched the team's name in the game schedule data 10, the article component 110 identifies the article 16 as a sports article 18.

The article component 110 may perform additional processing to select the sports article 18 related to the sports game 12. The article component 110 may require a minimum number of matches between extracted entities 24 and the game schedule data 10 to identify the article as a sports article 18 related to the sports game 12. For example, the article component 110 requires that the extracted entities 24 match the team names and the game date 14 or the game name and number. By performing the additional processing, the article component 110 may only select the sports articles 18 related to the sports game 12. Thus, sports articles 18 related to the same domain (e.g., the same sport, the same team) may not be selected if the sports articles 18 are not related to the specific event (e.g., the scheduled sports game 12). The article component 110 may extract the entities 24 for each of the articles 16 selected within the timeframe 20 and determine whether each article 16 is a sports article 18.

The article component 110 may provide the sports articles 18 to a classification model 112 that classifies the sports articles 18 into different clusters 26, where each cluster has a label indicating a different category for each cluster. Example categories include preview, team lineups, game highlights, general information, or unrelated to the game. In some implementations, the article component 110 classifies the sports articles 18 into five different clusters 26. For example, the classification model 112 analyzes a portion of the sports articles 18 (title and description) and places the sports articles 18 into a cluster 26 based on the analysis.

The clusters 26 may be used to identify when to show the different sports articles 18 to ensure that the sports articles 18 are on point for the sports game 12. The clusters 26 may enable better responses to queries about particular aspects of the sports games 12 (e.g., highlights vs lineups). The clusters 26 also ensure that highlights for played games are shown and that pre-game content for upcoming games are shown. The clusters 26 may also be used to select a top article(s) and avoid showing duplicative articles, and thus, improving diversity of topic and/or point of view. There may be any number of clusters 26 and/or categories for the sports articles 18. In addition, the number of clusters 26 and/or categories may be change for different sports or leagues.

The classification model 112 may be a transformer machine learning model. In some implementations, the classification model 112 is a pretrained sports Bidirectional Encoder Representations from Transformers (BERT). The sports BERT may support multiple languages in determining the classification of the sports articles 18. The classification model 112 may provide the different clusters 26 of the sports articles 18 to the content component 108.

The content component 108 may apply one or more ranking 28 to the sports articles 18. The ranking 28 may be based on a relevance of the sports articles 18 to the sports game 12. The ranking 28 may determine an order for presenting the sports articles 18 to users. For example, the sports articles 18 with a higher ranking are presented first relative to the sports articles 18 with a lower ranking. The content component 108 may apply a ranking 28 to each cluster 26. As such, the sports articles 18 in each cluster 26 may be ranked in an order (e.g., a descending order with a highest ranked sports article 18 placed first).

The ranking 28 may be based on a click prediction of the sports articles 18. The sports articles 18 with a higher click prediction are ranked higher relative to the sports articles 18 with a lower click predication. In addition, the ranking 28 may be based on recent view count, provider quality, and/or image quality data.

In addition, the content component 108 may compare the different clusters 26 to the game date 14 and select the sports articles 18 from the different clusters 26 to present based on the game date 14. The content component 108 may use the clusters 26 to determine which sports articles 18 are appropriate to present to the users based on the game situation. If the game date 14 is for an upcoming date, the content component 108 may select the clusters 26 with sports articles 18 relating to upcoming games, such as, a preview cluster and a team line up cluster. If the game date 14 is for a past date, the content component 108 may select the clusters 26 with the sports articles 18 relating to past games, such as, a game highlight cluster. For example, the content component 108 adjusts the ranking 28 of the sports articles 18 based on the comparison of the different clusters 26 to the game date 14 (e.g., if the game date 14 is for a past date, the sports articles 18 in the game highlight clusters may have a higher ranking 28 relative to the sports articles 18 in the preview cluster).

The content component 108 may associate the sports articles 18 to the game schedule data 10 based on a comparison of the different clusters 26 to the game date 14. The content component 108 may compare the labels of the different clusters 26 to the game date 14 to determine whether the sports articles 18 are related to the sports game 12. The content component 108 may adjust the ranking 28 of the sports articles 18 included in the different clusters 26 based on the comparison of the labels of the different clusters 26 to the game date 14. For example, the sports articles 18 included in a cluster 26 with a label for game highlights has a lower ranking 28 for a sports game 12 that is upcoming as compared to the ranking 28 for sports articles 18 included in a cluster 26 with a label of game preview.

The content component 108 may also apply a clustering algorithm 27 to the sports articles 18 in each cluster 26. The clustering algorithm 27 may group similar sports articles on the same topic (e.g., player injury, player availability) together. The content component 108 may take the top ranked sports article 18 from each group to ensure that a diverse set of topics are shown in the sports articles 18 presented to the user.

The content component 108 may store the associated sports articles 18 and the game schedule data 10 in a datastore 114. The content component 108 may also store any ranking 28 for the sports articles 18. In some implementations, the content component 108 tags the sports articles 18 to the game schedule data 10 and stores the tagged sports articles 18 to the game schedule data 10 in the datastore 114.

The processing of the environment 100 may occur offline on a periodic basis. The content component 108 may obtain the game schedule data 10 within a given cadence (e.g., weekly) and the content component 108 may automatically associate any upcoming sports game 12 within the week with the related sports articles 18 and save the associated sports articles 18 with the game schedule data 10 for the upcoming sports games 12. As such, the content component 108 may store pre-associated sports articles 18 to the game schedule data 10 so that the pre-associated sports articles 18 may be easily loaded and presented on a webpage with the game schedule data 10.

The environment 100 may have multiple machine learning models (e.g., entity model 22 and/or classification model 112) running simultaneously. In some implementations, one or more computing devices are used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the content component 108, the article component 110, the classification model 112, and/or the datastores 102, 104, 106, 114 are implemented wholly on the same computing device. Another example includes one or more subcomponents of the content component 108, the article component 110, the classification model 112, and/or the datastores 102, 104, 106, 114 implemented across multiple computing devices. Moreover, in some implementations, the content component 108, the article component 110, the classification model 112, and/or the datastores 102, 104, 106, 114 are implemented or processed on different server devices of the same or different cloud computing networks. Moreover, in some implementations, the features and functionalities are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Referring now to FIG. 2, illustrated is an environment 200 for presenting the game schedule data 10 and the associated sports articles 18 to users 204 of the environment 200. The environment 200 may include one or more users 204 interacting with one or more devices 202. The devices 202 may include one or more browsers 30 that allow the users 204 to interact with information on the World Wide Web. When a user 204 requests a sports webpage 32 from a website (by performing a search using the browser 30 or entering in a uniform resource locator (URL) of a website using the browser 30), the browser 30 retrieves the content of the webpage 32 from a webserver (e.g., the content component 108) and displays the webpage 32 on a display 206 of the user's device 202. The webpage 32 may be any webpage (third party webpages or webpages from the same party that provides the browser 30). In addition, the browser 30 may be a browser application on a device 202 of the user 204. Examples of browsers 30 include, but are not limited to, EDGE™ and INTERNET EXPLORER™.

The browser 30 may present game schedule data 10 for any scheduled sports game 12. For example, the browser 30 presents a sports card with the game schedule data 10. The game schedule data 10 may be presented for sports games 12 based on user preferences (a favorite team identified by the user 204 or a favorite sports identified by the user 204), user location (games playing nearby the user 204), and/or a search history of the user 204. The users 204 may view the game schedule data 10 when interacting with the browser 30.

When the user 204 selects the game schedule data 10 or the scheduled sports game 12, the browser 30 may launch a sports webpage 32 for the scheduled sports game 12. The browser 30 may receive the game schedule data 10 for the sports game 12 and the sports articles 18 associated with the sports game 12 from the content component 108 to present on the sports webpage 32.

The sports articles 18 may be presented in a carousel on the sports webpage 32. In addition, the sports articles 18 may be presented based on the ranking 28 of the sports articles 18. For example, the sports articles 18 with the highest rankings is placed first in the carousel and the remaining sports articles 18 may be presented in the carousel in a descending order.

As such, when the user 204 selects a sports game 12, the browser 30 may automatically receive the sports articles 18 already stored and associated with the sports game 12 in the datastore 114 from the content component 108 for presentation on the sports webpage 32. The environment 200 surfaces the sports articles 18 for the scheduled sports games 12 along with the game schedule data 10 for the scheduled sports games 12 for easy consumption by the users 204.

In some implementations, one or more computing devices are used to perform the processing of the environment 200.

The one or more computing devices 202 may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices.

In some implementations, each of the components of the environment 200 is in communication with each other using any suitable communication technologies. In addition, while the components of the environment 200 are shown to be separate, any of the components or subcomponents may be combined into fewer components, such as into a single component, or divided into more components as may serve a particular implementation. In some implementations, the components of the environment 200 include hardware, software, or both. For example, the components of the environment 200 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 200 include hardware, such as a special purpose processing device to perform a certain function or group of functions. In some implementations, the components of the environment 200 include a combination of computer-executable instructions and hardware.

Figure 3:
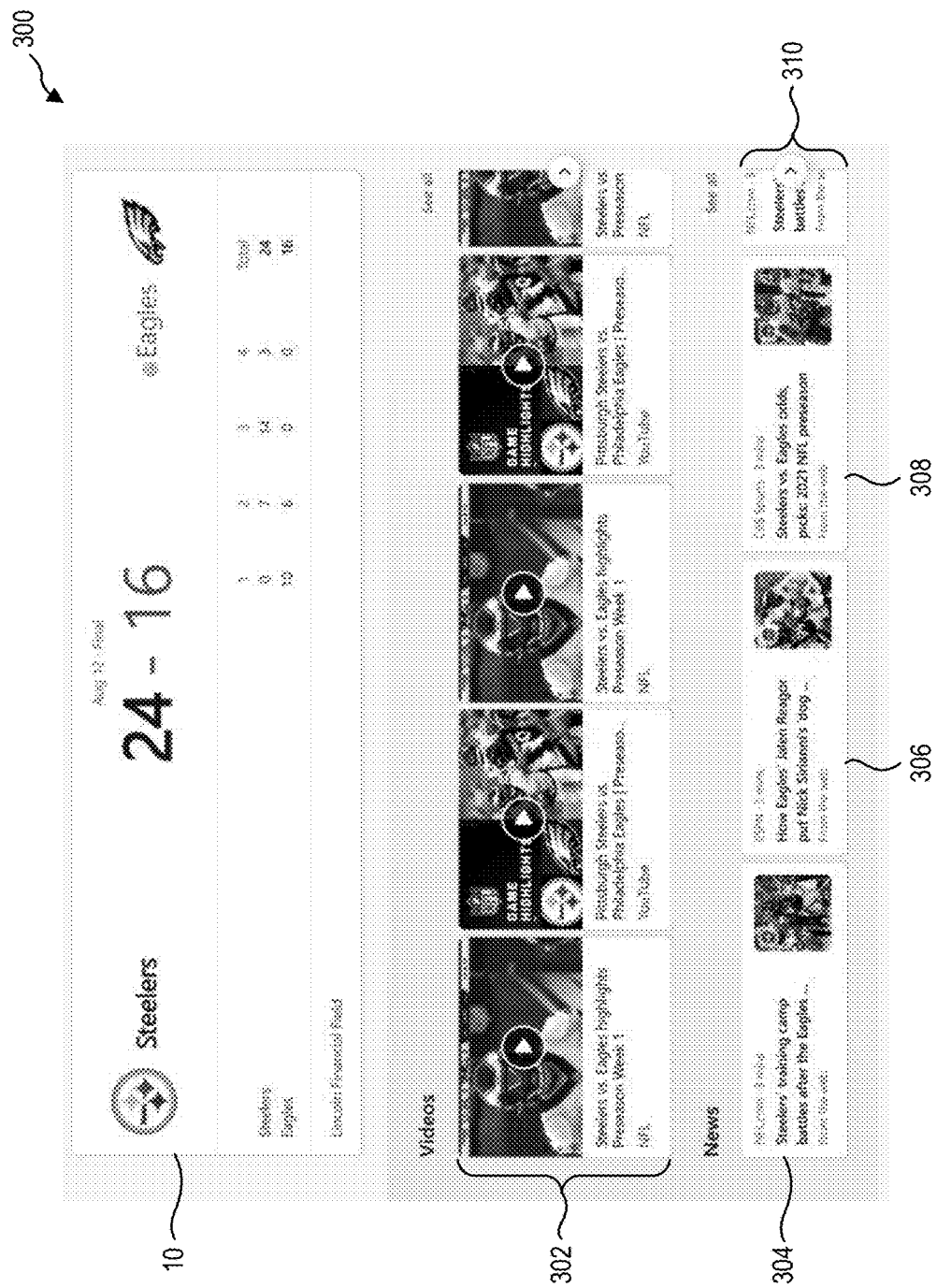
FIG. 3 illustrates an example graphical user interface of a webpage displaying a sports game schedule information and additional content in accordance with implementations of the present disclosure.

Referring now to FIG. 3, illustrated is an example of a graphical user interface 300 of a sports webpage 32 (FIG. 2) presented in a browser 30 (FIG. 2). The sports webpage 32 may include game schedule data 10 for an upcoming sports game 12 (FIG. 2). For example, the sports game 12 is a football game. The game schedule data 10 includes the team names (the Steelers and the Eagles), the final score (24-16), the game date (August 12$^{th}$), and the venue (Lincoln Financial Field). The sports webpage 32 also includes a plurality of videos 302.

In addition, the sports webpage 32 includes a plurality of articles 304, 306, 308 associated with the sports game 12 presented in a carousel 310. The carousel 310 allows the user 204 (FIG. 2) to scroll through the different sports articles 304, 306, 308 related to the sports game 12. For example, the content component 108 (FIG. 2) retrieves the sports articles 304, 306, 308 for the sports game 12 from the datastore 114 (FIG. 2) upon the user 204 selecting the sports webpage 32. As such, the sports webpage 32 may automatically display the sports articles 304, 306, 308 received from the content component 108 in the carousel 310 in response to the user selecting the sports webpage 32.

Figure 4:
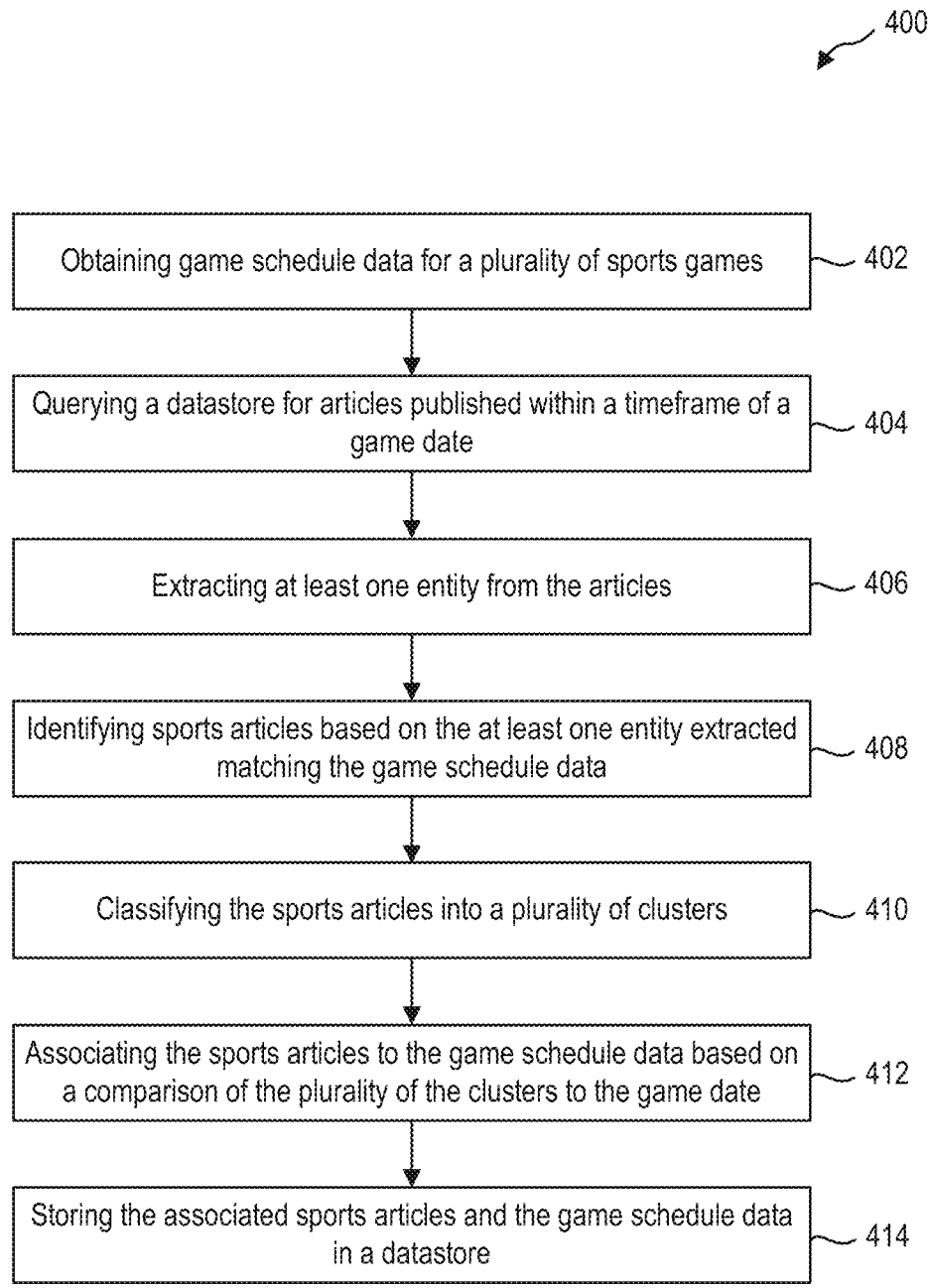
FIG. 4 illustrates an example method for automatically associating additional content with sports games schedule data in accordance with implementations of the present disclosure.

Referring now to FIG. 4, illustrated is an example method 400 for automatically associating additional content with sports games schedule data. The actions of the method 400 are discussed below with reference to the architectures of FIGS. 1 and 2.

At 402, the method 400 includes obtaining game schedule data for a plurality of sports games. The content component 108 obtains the game schedule data 10 for a plurality of sports games 12 from the datastore 102.

The method 400 is performed for each sports games included in the plurality of the sports games. At 404, the method 400 includes querying a datastore for articles published within a timeframe of a game date. The article component 110 queries the datastores 104, 106 for the articles 16 published within a timeframe 20 of the game date 14.

At 406, the method 400 includes extracting at least one entity from the articles. The entity model 22 extracts one or more entities 24 from the articles 16.

At 408, the method 400 includes identifying sports articles based on the at least one entity extracted matching the game schedule data. The article component 110 identifies sports articles 18 based on the extracted entities 24 matching the game schedule data 10 for the sports game 12.

At 410, the method 400 includes classifying the sports articles into a plurality of clusters. The classification model 112 classifies the sports articles 18 into a plurality of clusters 26. In some implementations, the classification model 112 classifies the sports articles 18 into two clusters 26, a first cluster and a second cluster. The first cluster is a post-event cluster with the sports articles 18 for events that have occurred. Examples of the sports articles 18 included in the first cluster include, but are not limited to, sports articles with game highlights, sports articles with score information, sports articles with post-game analysis, and/or sports articles with post-game events. In some implementations, the first cluster includes a label that identifies the category of the sports articles included in the first cluster. For example, the category of the first cluster is post-event sports articles.

The second cluster is a pre-event cluster with sports articles for upcoming events. Examples of the sports articles 18 included in the second cluster include, but are not limited to, sports articles with betting lines, sports articles with game previews, sports articles with predictions, sports articles with team lineups, sports articles with pre-game analysis, and/or sports articles with pre-game events. In some implementations, the second cluster includes a label that identifies the category of the sports articles included in the first cluster. For example, the category of the second cluster is pre-event sports articles.

At 412, the method 400 includes associating the sports articles to the game schedule data based on a comparison of the plurality of the clusters to the game date. The content component 108 associates the sports articles 18 to the game schedule data 10 based on a comparison of the clusters 26 to the game date 14. In some implementations, the content component 108 associates the sports articles 18 to the game scheduled data 10 based on a comparison of the first cluster and the second cluster to the game date 14.

At 414, the method 400 includes storing the associated sports articles and the game schedule data in a datastore. The content component 108 stores the associated sports articles 18 and the game schedule data 10 in a datastore 114.

Figure 5:
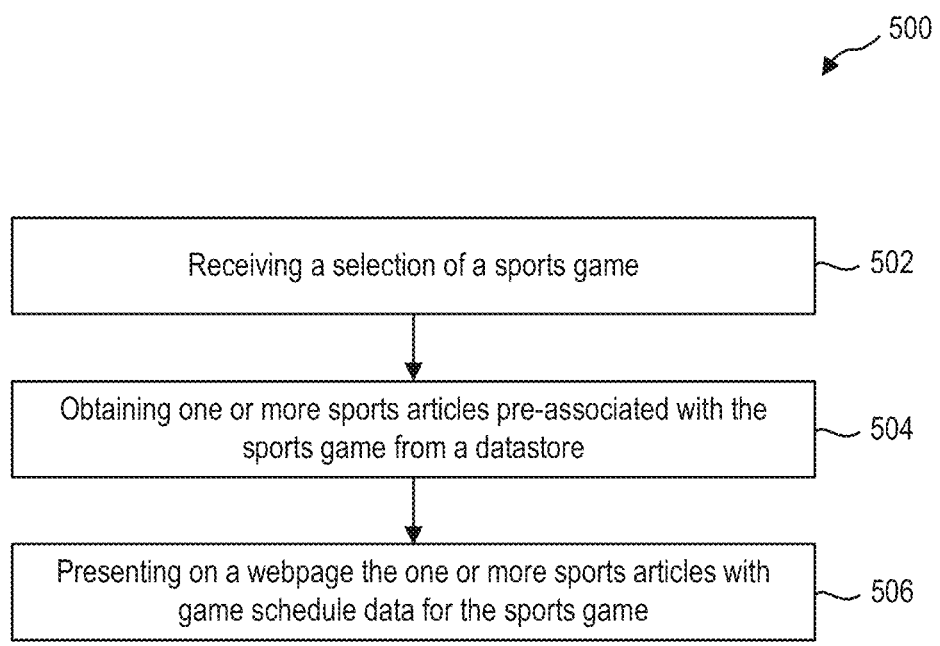
FIG. 5 illustrates an example method for presenting additional content with scheduled sports games in accordance with implementations of the present disclosure.

Referring now to FIG. 5, illustrated is an example method 500 for presenting additional content with sports games on a webpage. The actions of the method 500 are discussed below with reference to the architectures of FIGS. 1 and 2.

At 502, the method 500 includes receiving a selection of a sports game. The browser 30 receives a selection of a sports game 12 from a user 204.

At 504, the method 500 includes obtaining one or more sports articles pre-associated with the sports game from a datastore. The browser 30 receives the one or more pre-associated sports articles 18 for the sports game 12 stored in the datastore 114 from the content component 108. In some implementations, the sports articles 18 are classified in the datastore 114 into a first cluster (e.g., clusters 26) with the sports articles 18 for events that have occurred and a second cluster (e.g., clusters 26) with the sports articles 18 for upcoming events. The first cluster includes, for example, sports articles with game highlights, sports articles with score information, sports articles with post-game analysis, and/or sports articles with post-game events. The second cluster includes, for example, sports articles with betting lines, sports articles with game previews, sports articles with predictions, sports articles with team lineups, sports articles with pre-game analysis, and/or sports articles with pre-game events.

The sports articles 18 are obtained from the first cluster or the second cluster based on a game date 14. For example, if the game date 14 is for a sports game 12 that is already played, the sports articles 18 are obtained from the second cluster (e.g., the cluster with the post-event sports articles), and if the game date 14 is for a sports game 12 that is upcoming, the sports articles 18 are obtained from the first cluster (e.g., the cluster with the pre-event sports articles).

At 506, the method 500 includes presenting on a webpage the one or more sports articles with game schedule data for the sports game. The browser 30 presents on a sports webpage 32 the sports articles 18 and the game schedule data 10 for the sports game 12.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a binary model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art would realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The present disclosure is related to methods and systems for automatically identifying additional content for events without manual intervention. The methods and systems identify scheduled events, and for each scheduled event, the methods and systems select articles published within a timeframe of the event date. Entities and event phrases are extracted from the articles by an entity machine learning model and the articles are selected that have entities that are participating in the event or related to the event (e.g., teams playing a sport, speakers at the event, bands playing a concert) and have information identifying the scheduled event.

A transformer machine learning model is used to classify the articles into clusters. The clusters may be used to determine which articles to associate with the scheduled event and which articles to present to the users based on the event information. In some implementations, articles in each cluster with a highest rank are selected as the additional content to present to the user for the event. In some implementations, the clusters determine which sports articles to associate with the game schedule data for a sporting event. The clusters may be used to determine which sports articles to present to the users based on the game situation. For example, articles placed in a cluster for game highlights are shown for games already played and articles placed in a cluster for team line ups are shown for upcoming games. In addition, a clustering algorithm is used to group similar articles in a cluster. Articles in each cluster with a highest rank may be selected as the additional content to present to the user for the sports game One technical advantage of the methods and systems is to automatically identify articles associated with a specific event and surface the articles to the users on a webpage for easy consumption by the users.

(A1) Some implementations include a method for automatically associating additional content with sports games schedule data. The method includes obtaining (402) game schedule data (e.g., game schedule data 10) for a plurality of sports games (e.g., sports game 12). For each sports game in the plurality of sports games, the method includes: querying (404) a datastore (e.g., datastores 104, 106) for articles (e.g., articles 16) published within a timeframe (e.g., timeframe 20) of a game date (e.g., game date 14); extracting (406) at least one entity (e.g., entity 24) from the articles; identifying (408) sports articles (e.g., sports articles 18) based on the at least one entity extracted matching the game schedule data; classifying (410) the sports articles into a first cluster (e.g., clusters 26) and a second cluster (e.g., clusters 26), the first cluster includes the sports articles for events that have occurred, and the second cluster includes the sports articles for upcoming events; associating (412) the sports articles to the game schedule data based on a comparison of the first cluster and the second cluster to the game date; and storing (414) the associated sports articles and the game schedule data in a datastore (e.g., datastore 114).

(A2) In some implementations of the method of A1, the game schedule data includes one or more of participating team names, the game date, a venue for the game, a game name, or a game number.

(A3) In some implementations of the method of A1 or A2, the at least one entity includes one or more of participating team names, a game name, a game number, or a venue for the game (A4) In some implementations of the method of any of A1-A3, the first cluster includes the sports articles with one or more of game highlights, scores, post-game analysis, or post-game events.

(A5) In some implementations of the method of any of A1-A4, the second cluster includes the sports articles with one or more of betting lines, previews, predictions, team lineups, pre-game analysis, or pre-game events.

(A6) In some implementations of the method of any of A1-A5, the game schedule data is obtained for the sports games occurring within the next two week.

(A7) In some implementations of the method of any of A1-A6, the game schedule data is obtained for the sports games played within the last week.

(A8) In some implementations of the method of any of A1-A7, the timeframe is a first number of days before the game date and a second number of days after the game date.

(A9) In some implementations of the method of any of A1-A8, the timeframe is based on one or more of a type of sport or a league.

(A10) In some implementations, the method of any of A1-A9 includes ranking the sports articles.

(A11) In some implementations of the method of any of A1-A10, the ranking is based on a click prediction of the sports articles and the sports articles with a higher click prediction are ranked higher relative to the sports articles with a lower click predication.

(A12) In some implementations of the method of any of A1-A11 includes causing a subset of the sports articles to be presented based on the ranking, wherein a highest ranked article of the subset of the sports articles is presented first.

(A13) In some implementations, the method of any of A1-A12 includes selecting a highest ranked article from the first cluster and the second cluster to be presented.

(A14) In some implementations, the method of any of A1-A13 includes applying a clustering algorithm to group similar sports articles within the first cluster together; applying a clustering algorithm to group similar sports articles within the second cluster together; and causing a highest ranked article from each group of similar sports articles to be presented.

(A15) In some implementations of the method of any of A1-A14, a transformer machine learning model classifies the sports articles into the first cluster and the second cluster.

(A16) In some implementations of the method of any of A1-A15, the first cluster and the second cluster include a label that identifies a category of articles included the first cluster and the second cluster, and the category of the sports articles in the first cluster is post-event articles and the category of the sports articles in the second cluster is pre-event articles.

(A17) In some implementations of the method of any of A1-A16, the category of articles includes one or more of preview, team lineup, game highlights, general information, or an unrelated to the sports game.

(A18) In some implementations, the method of any of A1-A17 includes causing the sports articles to be presented in a carousel on a webpage with the game schedule data.

(A19) In some implementations of the method of any of A1-A18, causing the sports articles to be presented occurs in response to receiving a selection of the sports game.

(A20) In some implementations of the method of any of A1-A19, the articles are from a plurality of content providers.

(B1) Some implementations include a method for presenting additional content with sports games on a webpage. The method includes receiving (502) a selection of a sports game (e.g., sports game 12). The method includes obtaining (504) one or more sports articles (e.g., sports articles 18) pre-associated with the sports game from a datastore (e.g., datastore 114), the sports articles are classified in the datastore into a first cluster with the sports articles for events that have occurred and a second cluster with the sports articles for upcoming events, and the sports articles are obtained from the first cluster (e.g., clusters 26) or the second cluster (e.g., clusters 26) based on a game date (e.g., game date 14). The method includes presenting (506) on the webpage (e.g., sports webpage 32) the one or more sports articles with game schedule data (e.g., game schedule data 10) for the sports game.

(B2) In some implementations of the method of B1, the one or more sports articles are presented in a carousel.

(B3) In some implementations of the method of B1 or B2, the one or more sports articles are presented based on a ranking.

(B4) In some implementations of the method of B1-B3, the selection of the sports game occurs in response to a user selecting a sports card for the sports game or the user selecting a search result for the sports game.

(B5) In some implementations of the method of any of B1-B4, the one or more sports articles are published by different content providers.

(B6) In some implementations of the method of any of B1-B5, the first cluster includes the sports articles with one or more of game highlights, scores, post-game analysis, or post-game events, and the second cluster includes the sports articles with one or more of betting lines, previews, predictions, team lineups, pre-game analysis, or pre-game events.

Some implementations include a system (environment 100). The system includes one or more processors; memory in electronic communication with the one or more processors; and instructions stored in the memory, the instructions being executable by the one or more processors to perform any of the methods described here (e.g., A1-A20, B1-B6).

Some implementations include a computer-readable storage medium storing instructions executable by one or more processors to perform any of the methods described here (e.g., A1-A20, B1-B6).

Some implementations include a browser (e.g., browser 30) executable by one or more processors to perform any of the methods described herein (e.g., A1-A20, B1-B6).

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for presenting additional content with sports games schedule data, comprising:
    obtaining, by a server device, game schedule data for a plurality of sports games; and
    for a sports game in the plurality of sports games:
        determining, by the server device, an article timeframe based on a first game type of the sports game, wherein the article timeframe includes a first number of days occurring before the sports game of the first game type and a second number of days occurring after the sports game of the first game type, and wherein different type of sports games have different article timeframes;
        querying, by the server device, a datastore for articles published within the article timeframe of a game date of the sports game;
        extracting, by the server device, at least one entity from the articles;
        identifying, by the server device, sports articles within the article timeframe based on the at least one entity extracted matching the game schedule data;
        generating, by the server device, a first cluster and a second cluster based on the game date, wherein the first cluster includes the sports articles for the second number of days after the game date when the sports game has occurred, and the second cluster includes the sports articles for the first number of days prior to the game date when the sports game is upcoming;
        generating sports article rankings for the first cluster or the second cluster based on the game schedule data for the sports game, using a machine learning model trained to correlate sports entity data with sports articles;
        storing, in the datastore, ranked sports articles of the first cluster or the second cluster based on whether the sports game has occurred; and
        providing one or more of the ranked sports articles of the first cluster or the second cluster based on whether the sports game has occurred.

2. The method of claim 1, wherein the game schedule data includes one or more of participating team names, the game date, a venue for the sports game, a game name, or a game number.

3. The method of claim 1, wherein the at least one entity includes one or more of participating team names, a game name, a game number, or a venue for the sports game.

4. The method of claim 1, wherein the first cluster includes the sports articles with one or more of game highlights, scores, post-game analysis, or post-game events.

5. The method of claim 1, wherein the second cluster includes the sports articles with one or more of betting lines, previews, predictions, team lineups, pre-game analysis, or pre-game events.

6. The method of claim 1, wherein the game schedule data is obtained for the sports game occurring within a next two weeks.

7. The method of claim 1, wherein the game schedule data is obtained for the sports games played within a last week.

8. The method of claim 1, wherein the article timeframe is the first number of days before the game date and the second number of days after the game date.

9. The method of claim 1, wherein the article timeframe is based on one or more of a type of sport or a league.

10. A method for presenting additional content with sports games schedule data, comprising:
    obtaining, by a server device, game schedule data for a plurality of sports games; and
    for a sports game in the plurality of sports games:
        determining, by the server device, an article timeframe based on a first game type of the sports game, wherein the article timeframe includes a first number of days occurring before the sports game of the first game type and a second number of days occurring after the sports game of the first game type, and wherein different type of sports games have different article timeframes;
        querying, by the server device, a datastore for articles published within the article timeframe of a game date of the sports game;
        extracting, by the server device, at least one entity from the articles;
        identifying, by the server device, sports articles within the article timeframe based on the at least one entity extracted matching the game schedule data;
        generating, by the server device, a first cluster and a second cluster based on the game date, wherein the first cluster includes the sports articles for the second number of days after the game date when the sports game has occurred, and the second cluster includes the sports articles for the first number of days prior to the game date when the sports game is upcoming;

generating sports article rankings for the first cluster or the second cluster based on the game schedule data for the sports game using a machine learning model trained to correlate sports entity data with sports articles;

based on determining that the sports game has occurred, storing ranked sports articles from the first cluster in the datastore; and based on determining that the sports game has occurred, providing one or more ranked sports articles from the first cluster to a client device.

11. The method of claim 10, further comprising:
selecting a highest ranked article from the first cluster and the second cluster to be presented.

12. The method of claim 10, further comprising:
applying a clustering algorithm to group similar sports articles within the first cluster together;
applying the clustering algorithm to group similar sports articles within the second cluster together; and
causing a highest ranked article from each group of similar sports articles to be presented.

13. The method of claim 1, wherein a transformer machine learning model classifies the sports articles into the first cluster and the second cluster.

14. The method of claim 1, wherein:
the first cluster and the second cluster include a label that identifies a category of articles included in the first cluster and the second cluster; and
the category of the sports articles included in the first cluster is post-event articles and the category of the sports articles included in the second cluster is pre-event articles.

15. The method of claim 1, further comprising:
causing the sports articles to be presented in a carousel on a webpage with the game schedule data.

16. The method of claim 15, wherein causing the sports articles to be presented occurs in response to receiving a selection of the sports game.

17. The method of claim 1, wherein the articles are from a plurality of content providers.

18. A method of presenting additional content with sports games on a webpage, comprising:
receiving, via a browser, a selection of a sports game;
obtaining, by a server device, game schedule data for the sports game; and
for the sports game:

determining, by the server device, an article timeframe based on a first game type of the sports game, wherein the article timeframe includes a first number of days occurring before the sports game of the first game type and a second number of days occurring after the sports game of the first game type, and wherein different type of sports games have different article timeframes;

querying, by the server device, a datastore for articles published within the article timeframe of a game date of the sports game;

extracting, by the server device, at least one entity from the articles;

identifying, by the server device, sports articles within the article timeframe based on the at least one entity extracted matching the game schedule data;

generating, by the server device, a first cluster and a second cluster based on the game date, wherein the first cluster includes the sports articles for the second number of days after the game date when the sports game has occurred, and the second cluster includes the sports articles for the first number of days prior to the game date when the sports game is upcoming;

generating sports article rankings for the first cluster or the second cluster based on the game schedule data for the sports game using a machine learning model trained to correlate sports entity data with sports articles;

based on determining that the sports game is upcoming, storing ranked sports articles from the second cluster in the datastore; and based on determining that the sports game is upcoming, providing one or more ranked sports articles from the second cluster via the browser to a client device.

19. The method of claim 18, wherein;
the selection of the sports game occurs in response to a user selecting a sports card for the sports game or the user selecting a search result for the sports game; and
the one or more ranked sports articles are published by different content providers and presented in a carousel based on a ranking.

20. The method of claim 18, wherein;
the first cluster includes the sports articles with one or more of game highlights, scores, post-game analysis, or post-game events; and
the second cluster includes the sports articles with one or more of betting lines, previews, predictions, team line-ups, pre-game analysis, or pre-game events.

* * * * *